(12) United States Patent
Stanciu et al.

(10) Patent No.: US 10,880,138 B2
(45) Date of Patent: Dec. 29, 2020

(54) ACQUISITION OF A DATA PACKET HAVING A SHORT PREAMBLE

(71) Applicant: NXP USA, Inc., Austin, TX (US)

(72) Inventors: Mihai-Ionut Stanciu, Bucharest (RO); Khurram Waheed, Austin, TX (US); Raja Venkatesh Tamma, Cedar Park, TX (US); Claudio Gustavo Rey, Chandler, AZ (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/541,840

(22) Filed: Aug. 15, 2019

(65) Prior Publication Data

US 2020/0344096 A1    Oct. 29, 2020

(30) Foreign Application Priority Data

Apr. 24, 2019  (RO) ................................ A201900264

(51) Int. Cl.
*H04L 27/144* (2006.01)
*H04L 27/10* (2006.01)
*H04L 27/156* (2006.01)

(52) U.S. Cl.
CPC .......... *H04L 27/144* (2013.01); *H04L 27/103* (2013.01); *H04L 27/1563* (2013.01)

(58) Field of Classification Search
CPC .. H04L 27/144; H04L 27/103; H04L 27/1563
USPC ....................................................... 375/262
See application file for complete search history.

(56) References Cited

U.S. PATENT DOCUMENTS

| 7,003,063 | B2 | 2/2006 | Mill |
| 7,035,352 | B1 | 4/2006 | Malone et al. |
| 7,751,502 | B2 | 7/2010 | Kwak et al. |
| 9,246,669 | B2 | 1/2016 | Khan et al. |
| 9,479,288 | B2 | 10/2016 | Waheed et al. |
| 9,729,195 | B2 | 8/2017 | Tamma et al. |
| 9,794,056 | B1 | 10/2017 | Tamma et al. |
| 9,853,787 | B2 | 12/2017 | Stanciu et al. |

(Continued)

FOREIGN PATENT DOCUMENTS

| EP | 2959591 A1 | 8/2014 |
| JP | 5606411 B2 | 10/2014 |
| WO | WO-2011/059509 A2 | 5/2011 |

OTHER PUBLICATIONS

Bynam, Kiran et al., "Samsung and IMEC physical layer merged proposal", IEEE Draft P802.15 Working Group for Wireless Personal Area Networks (WPANs), Mar. 1, 2014, pp. 1-31, retrieved from the internet at https://mentor.ieee.org/802.15/den/14/15/14/0178-00-004g-samsung-imec-physical-layer-merger-proposal.pdf on Mar. 18, 2014.

(Continued)

*Primary Examiner* — Ted M Wang (57) ABSTRACT

An acquisition detector and method include a preamble detector configured to search in a plurality of symbols for a preamble match with a known preamble pattern when a power level of the input signal exceeds a determined noise threshold. The acquisition detector further includes a frame delimiter detector configured to search in the plurality of symbols for a frame delimiter match with a known frame delimiter pattern when the preamble match is identified and the power level of the input signal exceeds a determined noise threshold.

18 Claims, 7 Drawing Sheets

(56) References Cited

U.S. PATENT DOCUMENTS

2007/0086423 A1* 4/2007 Zeng .................. H04L 69/22
    370/349
2013/0114645 A1* 5/2013 Huang ................ H04B 1/7083
    375/147

OTHER PUBLICATIONS

Chen, Yongrui et al., "TwinBee: Reliable Physical-Layer Cross-Technology Communication with Symbol-Level Coding", IEEE InfoCom 2018 IEEE Conference on Computer Communications, Apr. 16, 2018, pp. 153-161, IEEE, Piscataway, NJ, USA.

Shin, Soo Young et al., "New Energy Efficient Clear Channel Assessment for Wireless Network", KSII Transactions on Internet and Information Systems, Aug. 1, 2011, pp. 1404-1422, vol. 5, No. 8, KSII, Seoul, Republic of Korea.

* cited by examiner

ACQUISITION OF A DATA PACKET HAVING A SHORT PREAMBLE

TECHNICAL FIELD

This disclosure relates generally to acquisition of data packets and, more specifically, to acquisition of frequency shift keying (FSK) data packets having short preambles.

BACKGROUND OF THE DISCLOSURE

Data may be transmitted between devices using standardized communication frames. The frames may arrive at a receiving device with varying levels of interference and at varying levels of signal strength or power. The received signals necessarily must be distinguished from unrelated signals or from ambient electronic noise. The transmitted communication frames include defined portions having known patterns. The defined portions, such as preambles and frame delimiters, may be identified thereby allowing the remainder of the frame to be demodulated to recover the communicated payload data.

Some devices utilize shorter defined-pattern portions to allow for a reduction in expended power to transmit the non-data portions of the frame. Accordingly, more robust techniques need to be employed to identify frame portions when the portions are shortened.

BRIEF DESCRIPTION OF THE DRAWINGS

Additional objects and features of the invention will be more readily apparent from the following detailed description and appended claims when taken in conjunction with the drawings. Although several embodiments are illustrated and described, like reference numerals identify like parts in each of the figures, in which:

It should be understood that the figures are merely schematic and are not drawn to scale. It should also be understood that the same reference numerals may be used throughout the figures to indicate the same or similar parts.

DETAILED DESCRIPTION

The disclosed embodiments find application to protocols that use packets with a short preamble pattern combined with a variable pattern frame delimiter of sufficient length. The embodiments combine an incoming signal power estimation, phase-domain (PD) preamble detection with a frequency-domain (FD) synchronization frame delimiter (SFD) detection. The combination provides performance not feasible using either of a preamble detector (PD) nor a frequency-domain (FD) synchronization frame delimiter (SFD) detector alone.

Acquisition detectors provide both timing estimation (symbol and frame timing) and frequency estimation (local oscillator (LO) estimation). In the disclosed embodiments, an advantage is realized by utilizing short preambles (e.g., 1-2 octet as used by Bluetooth-LE, ANT, IEEE 802.15.4 (FSK/GFSK/MSK PHYs) and other protocols) and a long frame delimiter (≥2 octet synchronization pattern). One advantage of detecting a short preamble is the ability to more quickly declare that a packet is found which enables an earlier performance of a clear channel assessment (CCA) and determination. Once a packet has been declared as found, then timing and frequency estimations may be subsequently performed using a frame delimiter.

The disclosed embodiments are able to quickly determine the packet presence, which may be useful for automatic gain control (AGC) and CSMA/CA. The packet detection also may be agnostic to a frame delimiter address for CSMA/CA and CCA channel assessment. Further, the frame delimiter detection is implemented in FM domain (which allows an efficient implementation of the correlation circuit and the possibility of estimating CFO).

Also, the preamble detector cannot be implemented in FM domain as correlation is highly unreliable on short correlation windows. The method and system described herein provides advantages over an FM domain preamble detector by performing the preamble detection in the PM domain.

According to one embodiment, a method of frame synchronization in a communication system is disclosed. The method includes receiving an input signal including a plurality of symbols of a communication frame, and searching in the plurality of symbols for a preamble match with a known preamble pattern when a power level of the input signal exceeds a determined noise threshold.

Other advantages are provided by a method that further includes searching in the plurality of symbols for a frame delimiter match with a known frame delimiter pattern when the preamble match is identified and the power level of the input signal exceeds a determined noise threshold. A remaining portion of the plurality of symbols is then demodulated when the frame delimiter match is identified and the power level of the input signal exceeds a determined noise threshold.

Other advantages may be provided by a method that further continuously detects the power level of the input signal during acquisition of the communication frame, and generating a signal present signal when the power level exceeds the predetermined power level. Such continuous detection of the power level provides a further advantage of allowing an acquisition detector, including a preamble detector and a frame delimiter detector, to remain powered off until a valid power level is detected. Also, the method may include continuously searching in the plurality of symbols for the preamble match while the searching in the plurality of symbols for the frame delimiter match occurs.

Further, when another preamble match is identified during the searching for the frame delimiter match, the method may reset a frame delimiter search timer and continue the searching in the plurality of symbols for the frame delimiter match with the known frame delimiter pattern. Further, when another preamble match is not identified before the frame delimiter search timer expires, ceasing searching in the plurality of symbols for a frame delimiter match.

The method may also include using a phase signal of the plurality of symbols with the input signal normalized in polar coordinates when searching in the plurality of symbols for the preamble match is performed. Also, using a dot product of an IQ signal formed from a phase signal of the plurality of symbols and the known frame delimiter pattern when the searching in the plurality of symbols for the frame delimiter match is performed.

Further, the method may include generating a timing correction signal from a magnitude portion of the dot product wherein the timing correction signal configured to adjust timing of the communication frame, and generating a carrier frequency correction signal from a phase portion of the dot product, wherein the carrier frequency correction signal configured to adjust a frequency for downconverting the input signal.

According to another embodiment, a system may include an acquisition detector configured to receive an input signal including a plurality of symbols of a communication frame. The acquisition detector may include a preamble detector configured to search in the plurality of symbols for a preamble match with a known preamble pattern when a power level of the input signal exceeds a determined noise threshold.

The acquisition detector may further include a frame delimiter detector configured to search in the plurality of symbols for a frame delimiter match with a known frame delimiter pattern when the preamble match is identified and the power level of the input signal exceeds a determined noise threshold. The system may further include a demodulator configured to demodulate a remaining portion of the plurality of symbols when the frame delimiter match is identified and the power level of the input signal exceeds a determined noise threshold.

The system may further include a power detector configured to continuously detect the power level of the input signal during acquisition of the communication frame, and generate a signal present signal when the power level of the input signal exceeds the predetermined power level. The preamble detector and the frame delimiter detector may be deactivated when the power level of the input signal does not exceed the predetermined power level. Further, the preamble detector may be further configured to continuously search in the plurality of symbols for the preamble match while the frame delimiter detector continues to search in the plurality of symbols for the frame delimiter match.

The acquisition detector may further include a frame delimiter search timer configured to reset and continue the search by the frame delimiter detector when another preamble match is found by the preamble detector, and the frame delimiter search timer may be further configured to cease searching in the plurality of symbols for a frame delimiter match when another preamble match is not identified before the frame delimiter search timer expires.

The preamble detector of the system may further be configured to search for the preamble match using a phase signal of the plurality of symbols with the input signal normalized in polar coordinates. The frame delimiter may be further configured to search for the frame delimiter match using a dot product of an IQ signal formed from a phase signal of the plurality of symbols and the known frame delimiter pattern.

Further, the frame delimiter detector may be configured to generate a timing correction signal from a magnitude portion of the dot product, with the timing correction signal configured to adjust timing of the communication frame. Also, the frame delimiter detector may be further configured to generate a carrier frequency correction signal from a phase portion of the dot product, the carrier frequency correction signal configured to adjust a frequency for downconverting the input signal.

In a further embodiment, an acquisition detector includes a preamble detector and a frame delimiter detector. The preamble detector may be configured to search in a plurality of symbols for a preamble match with a known preamble pattern when a power level of the input signal exceeds a determined noise threshold The frame delimiter detector may be configured to search in the plurality of symbols for a frame delimiter match with a known frame delimiter pattern when the preamble match is identified and the power level of the input signal exceeds a determined noise threshold. Further, the preamble detector may be configured to determine the preamble match based on a comparison in a phase domain, and the frame delimiter detector may be configured to determine the frame delimiter match in a frequency domain.

Figure 1:
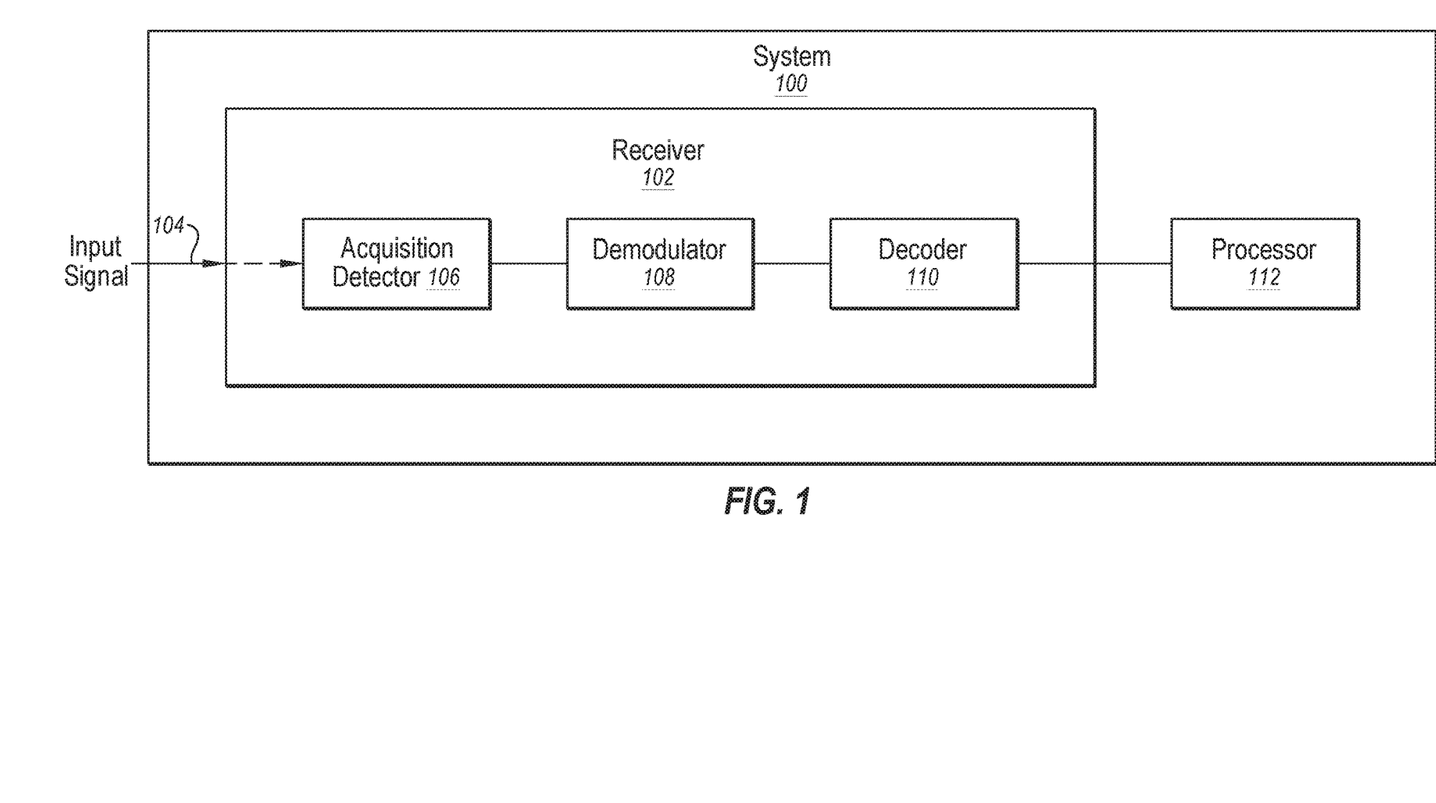
FIG. 1 illustrates a communication system for communicating digital data between two devices, in accordance with embodiments described herein.

FIG. 1 illustrates a communication system 100 configured to operate according to a communication standard, and example of which may be IEEE 802.15.4. The system 100 includes a receiver 102 controlled by a processor 112. The system 100 may include a receiver front-end (not shown) that is coupled to an antenna (not shown) and configured to receive a radio frequency (RF) input signal and downconvert the RF input signal into a baseband signal illustrated as input signal 104.

The receiver 102 may further include an acquisition detector 106 configured to receive the input signal 104 and generate various detect signals described below. The acquisition detector 106 may be configured to perform various functions described herein including preamble detection and frame delimiter detection. The acquisition detector 106, in response to preamble detection, may generate a preamble detect signal for use by other circuits such as automatic gain control (AGC) of the receiver front-end (not shown) and link layer (LL) processes (not shown). The acquisition detector 106, in response to detection of the frame delimiter, may generate signals such as a carrier frequency offset (CFO) estimate signal (not shown) and a fractional timing estimate signal (not shown) for use by other circuits.

The receiver 102 further includes a demodulator 108 configured to generate bit log-likelihood ratios (LLRs) for received symbols. The receiver 102 further includes a decoder 110. The decoder 110, which may, for example, be implemented as a Viterbi decoder, functions to decode received symbols.

It should be appreciated that components of the receiver 102 that are not deemed desirable for understanding the disclosed subject matter have been omitted for the sake of brevity. It should be understood that system 100 also includes a transmitter and other components (e.g., a monitoring device, input/output (I/O), and control circuitry), which have also been omitted for the sake of brevity.

Figure 2:
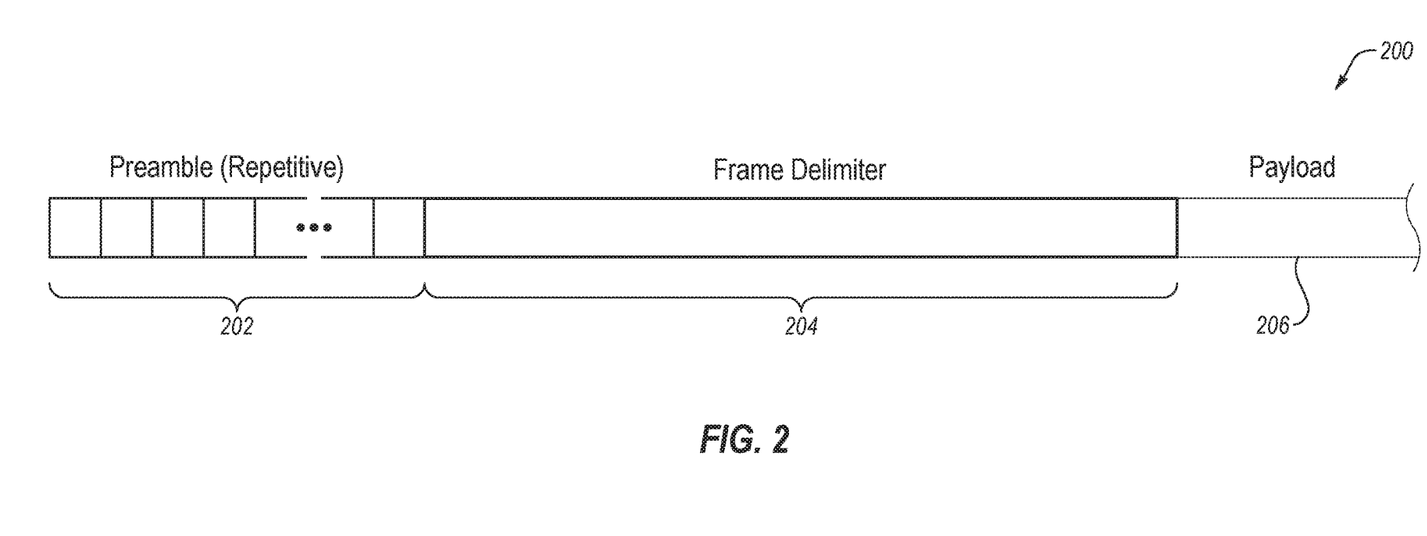
FIG. 2 illustrates a data frame as exchanged between a transmitter and a receiver, in accordance with embodiments described herein.

FIG. 2 illustrates a data frame 200 as exchanged between a transmitter and a receiver. The data frame 200 includes a preamble 202, a frame delimiter 204, and a payload data unit (PDU) 206. The various embodiments described herein illustrate an acquisition detector 106 which provides both time (symbol & frame timing) and frequency (LO error estimation) estimation.

One targeted use case may include a short preamble (e.g., 1-2 octet as used by Bluetooth-LE, ANT, IEEE 802.15.4 (FSK/GFSK/MSK PHYs), as well as other protocols. The use case may also include a long frame delimiter (e.g., ≥2 octet synchronization pattern). The preamble 202 may be of varying lengths, however, the preamble 202 is illustrated as a short preamble 202 of repetitive symbols. The frame delimiter 204 may be a long frame delimiter.

Further, the acquisition detector 106 may be configured to determine the packet presence as quickly as possible (for AGC and CSMA/CA). Yet further, the packet detection of the acquisition detector 106 needs to be agnostic to the frame delimiter address, for CSMA/CA and CCA channel assessment. The frame delimiter detection is implemented in the FM domain, which allows for an efficient implementation of the correlation circuit and the possibility of estimating CFO. The preamble detector is not implemented in the FM domain as correlation is typically highly unreliable on short correlation windows.

Figure 3:
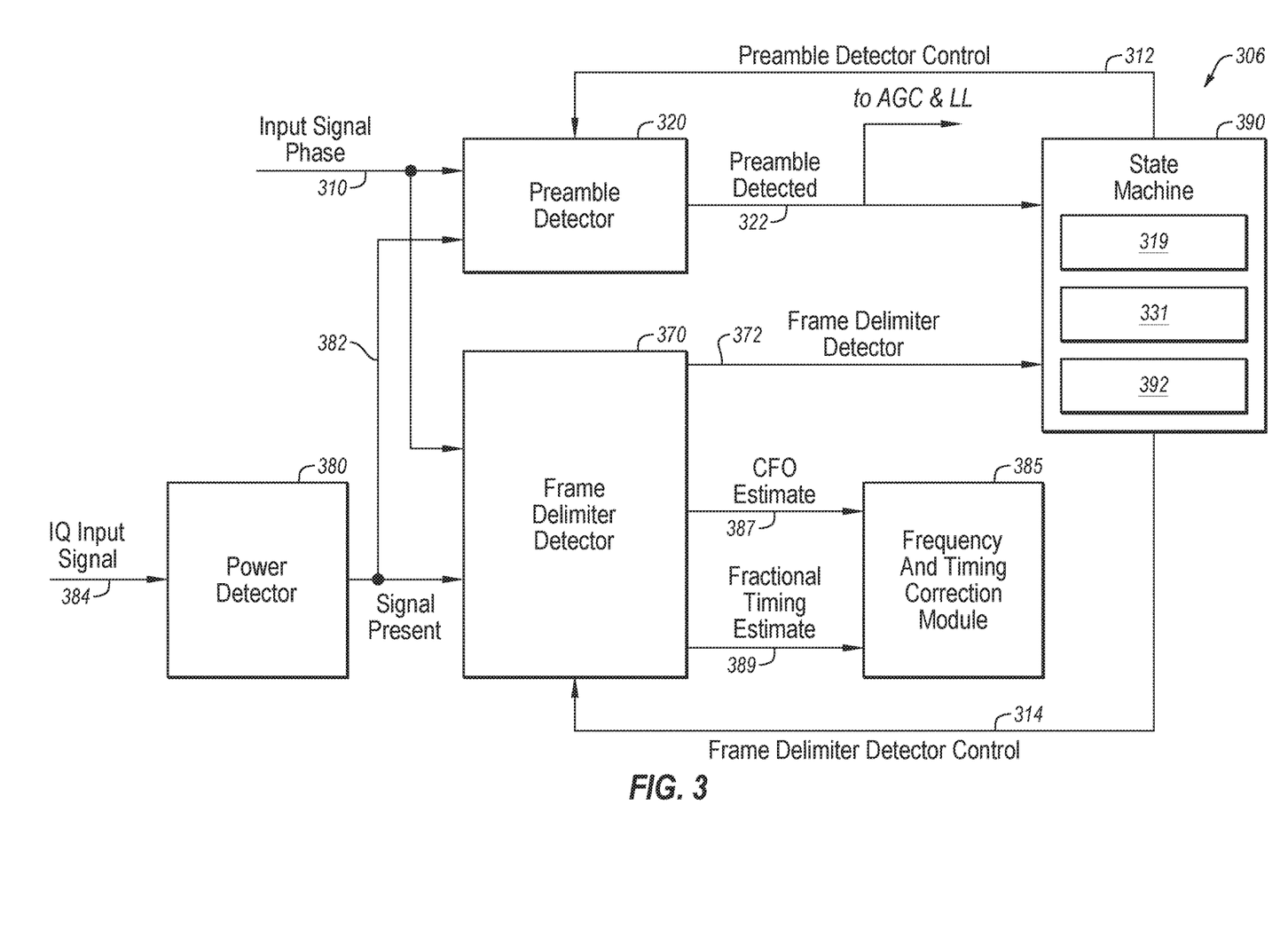
FIG. 3 illustrates an acquisition detector, in accordance with embodiments described herein.

FIG. 3 illustrates an acquisition detector, in accordance with an embodiment. An acquisition detector 306 may correspond to the acquisition detector 106 of FIG. 1. The acquisition detector 306 operates according to protocols that use packets with a short preamble pattern combined with a variable pattern frame delimiter of adequate length. The acquisition detector 306 may use a combination of an incoming signal power estimation, phase-domain (PD) preamble detection with a frequency-domain (FD) synchronization frame delimiter (SFD) detection to reap the salient benefits of each engine.

The acquisition detector 306 includes a preamble detector 320 and a frame delimiter detector 370, both controlled by a state machine 390. The preamble detector 320 operates on a phase domain input signal 310 determined from the input signal 104 of FIG. 1. The phase domain input signal 310 may be formed by generating a polar equivalent, including a unit magnitude signal and phase signal, of the input signal 104. The phase signal is then used for the phase input signal 310 as the magnitude signal was normalized. The phase domain input signal 310 couples to both the preamble detector 320 and the frame delimiter detector 370.

The state machine 390 generates control or enable signals for respectively enabling the preamble detector 320 and the frame delimiter detector 370. Specifically, the state machine 390 generates a preamble detector control signal 312 for enabling and disabling the preamble detector 320 to minimize power consumed by the preamble detector 320.

Similarly, the state machine 390 generates a frame delimiter control signal 314 for enabling and disabling the frame delimiter detector 370 to minimize power consumed by the frame delimiter detector 370. Significant power may be conserved by preventing the more complex and hence power-intense circuits of the frame delimiter detector 370 from being unnecessarily activated.

The acquisition detector 306 further includes a power detector 380 configured to monitor the input signal and generate a signal present signal 382 when a power level of the received signal exceeds a signal level threshold. More specifically, the power detector 380 receives an IQ input signal 384 which may be in an IQ format for providing a preferred representation for power measurement.

When the measured power of the IQ input signal 384 exceeds the signal level threshold, then the signal present signal 382 is generated to signify detection of an actual signal rather than just the presence of noise or unrelated signals. The signal present signal 382 is then used by both the preamble detector 320 and the frame delimiter detector 370 to prevent false detection of preambles or frame delimiters that may result from unrelated signals.

The acquisition detector 306 further includes a frequency and timing correction module 385 configured to receive a CFO estimate signal 387 and a fractional timing estimate signal 389 generated by the frame delimiter detector 370.

Both CFO estimate signal 387 and the fractional timing estimate signal 389 extracted from the frame delimiter detector 370 have improved quality over legacy preamble-based estimation methods.

In operation, the preamble detector 320 operates on the phase portion, phase domain input signal 310, of a polar domain input signal and generates the preamble detected signal 322 in response to a correlation pattern match with a preamble pattern 331. In contrast, the frame delimiter detector 370 operates on a frequency modulated (FM) signal by receiving the phase domain input signal 310 and converting the phase input signal into an FM input signal.

The frame delimiter detector 370 generates the frame delimiter detected signal 372 in response to a correlation pattern match with a frame delimiter pattern 319. As stated, the preamble detector 320 and the frame delimiter detector 370 are each enabled by the signal present signal 382 generated from the detection of the input signal 384.

Figure 4:
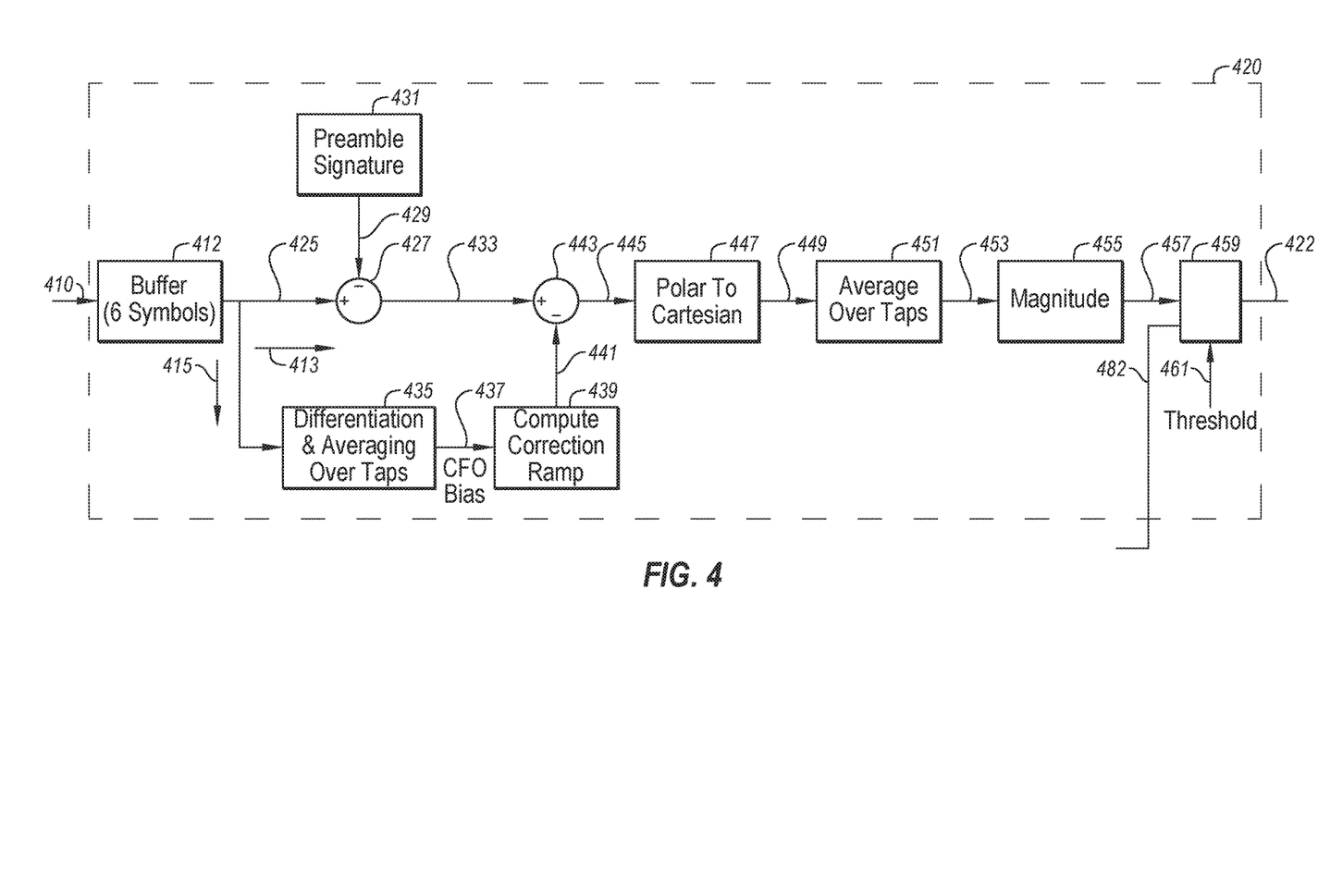
FIG. 4 illustrates a block diagram of a preamble detector, in accordance with embodiments described herein.

FIG. 4 illustrates a block diagram of a preamble detector, in accordance with an embodiment. A preamble detector 420 may correspond with the preamble detector 320 of FIG. 3. The preamble detector 420 receives a phase input signal 410, which may be a received signal converted to baseband and corresponding to symbols in a polar domain, as described with respect to input signal 310. The preamble detector 420 further includes a buffer 412 configured to receive the a plurality of symbols as provided by the phase input signal 410. By way of example, the buffer 412 may be configured to store six symbols, although the buffer 412 may be configured to store a greater or less than quantity of symbols.

The preamble detector 420 may further include a first forward path 413 including a first correlator 427 coupled to a buffered symbol signal 425 and a preamble pattern signal 429 generated by a preamble pattern 431. The first correlator 427 compares the buffered symbols against a stored or known preamble pattern to generate a preamble match signal 433. The preamble detector 420 further includes a second forward path 415 for providing differentiation of the input signal.

The second forward path 415 includes a differentiation and averaging module 435 for receiving the buffered symbol signal 425 and generating a CFO bias signal 437. The second forward path 415 further includes a correction module 439 configured to provide a integration of the CFO bias signal 437. The correction module 439 generates a correction CFO bias signal 441. The correction CFO bias signal 441 and the preamble match signal 433 are correlated by second correlator 443 which results in a single correllation output signal 445. The correllation output signal 445 is a signal in the phase domain.

The preamble detector 420 further includes a polar-to-Cartesian converter 447 for converting the correlator output signal 445 into IQ correlator output signal 449. The IQ correlator output signal 449 couples to an averaging module 451 configured to average the samples and generate an averaged IQ correlator output signal 453. A magnitude module 455 generates a magnitude correlator output signal 457 that is then compared at a comparator 459 with a preamble detect threshold signal 461.

When the magnitude correlator output signal 457 is greater than the preamble detect threshold signal 461, and the signal present signal 482 is asserted from the power detector 380 of FIG. 3, then the comparator 459 generates a preamble detect signal 422, which may correspond with the preamble detect signal 322 of FIG. 3.

It is noted that in preamble detection, a first assessment is performed by the power detector 380 of FIG. 3 which provides an assessment that the input signal level is above a threshold. Such an evaluation generates a signal present signal 482 and avoids the issue of the preamble detector falsing over noise samples and allows the detection thresholds to be tuned for higher detection sensitivity. Further, the signal energy detection by the power detector 380 may also allow the preamble detector and the frame delimiter detector to remain in a low power state in the absence of a viable input signal.

Figure 5:
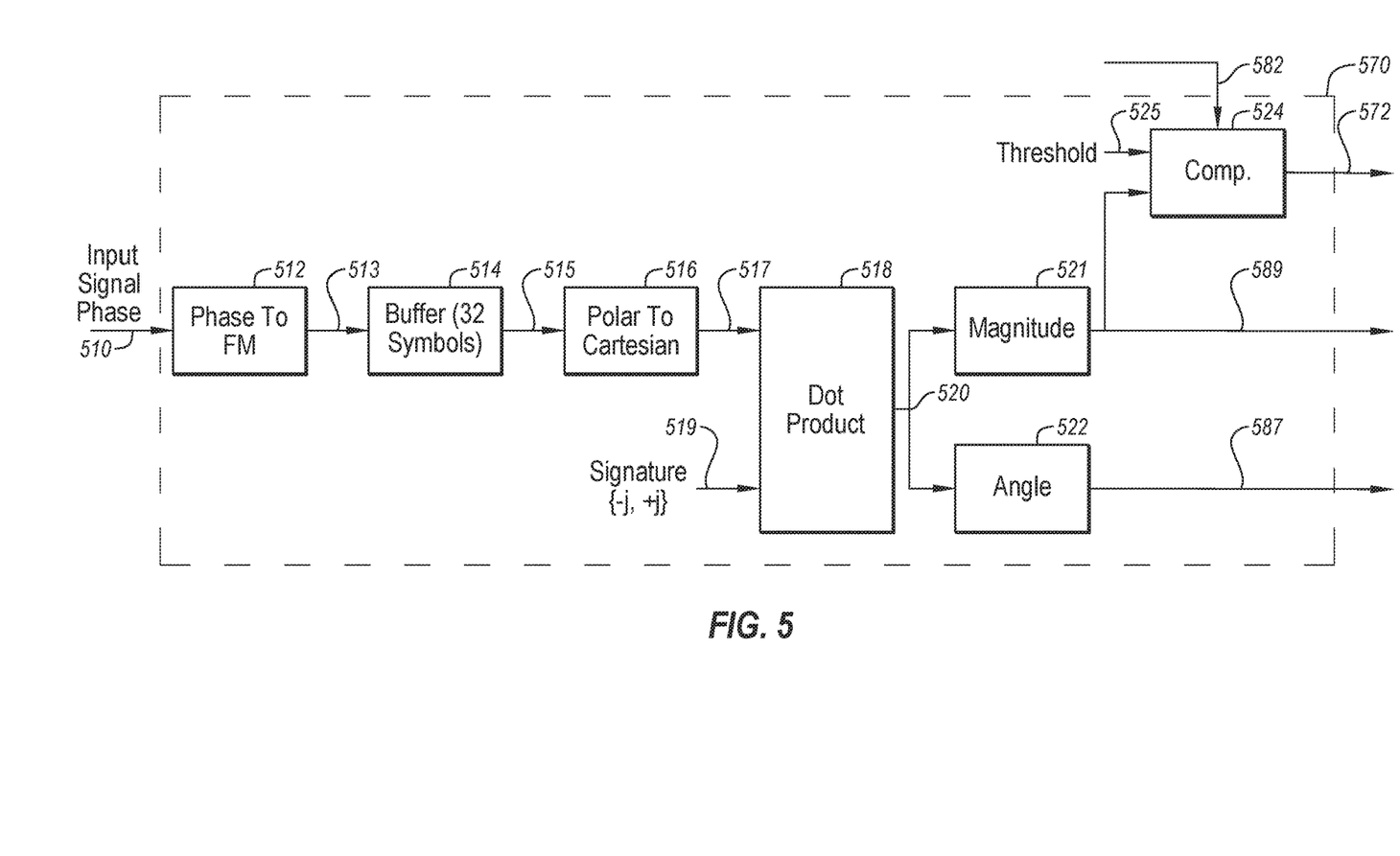
FIG. 5 illustrates a block diagram of the frame delimiter detector, in accordance with embodiments described herein.

FIG. 5 illustrates a block diagram of the frame delimiter detector, in accordance with an embodiment. A frame delimiter detector 570 may correspond to the frame delimiter detector 370 of FIG. 3. The frame delimiter detector 570 receives a phase input signal 510, which may be a received signal converted to baseband and corresponding to symbols in a polar domain.

The frame delimiter detector 570 includes a phase-to-FM converter 512 configured to convert the received symbols into the frequency domain as FM input signal 513. The frame delimiter detector 570 further includes a buffer 514 configured to receive the a plurality of symbols as provided by the phase input signal 510 and converted by the the phase-to-FM converter 512.

By way of example, the buffer 514 may be configured to store thirty-two symbols, although the buffer 514 may be configured to store a greater or less than quantity of symbols. The buffer 514 outputs buffered symbols 515 which are converted from polar-to-Cartesion format by a polar-to-cartesian converter 516 which outputs IQ signal 517.

A dot product module 518 then performs a dot product operation with the IQ signal 517 and a frame delimiter pattern 519 resulting in a dot product 520 comprising a magnitude component 521 and an angle component 522. The magnitude component 521 may be used to estimate the fractional timing error resulting in a fractional timing estimate signal 589. The magnitude component 521 may also be compared at comparator 524 against a threshold signal 525. When the magnitude component 521 exceeds the threshold signal 525, and the signal present signal 582 is asserted from the power detector 380 of FIG. 3, then the comparator 524 generates a frame delimiter detected signal 572. Further, the angle component 522 may be used to generate the CFO estimate signal 587.

In operation, the preamble detector has to be able to detect a short preamble, which is better performed using correlation in the phase domain. Phase domain correlation is intrinsically more complex than the FM domain correlator (for the same number of correlation taps). Accordingly, phase domain correlation allows getting observable correlation peaks when the correlation window is small (i.e., phase domain correlation is suitable for the detection of the short preamble).

The purpose of the preamble detector is to detect an incoming packet where no synchronization information is used due to the low reliability, which provides an early indication of a packet arrival which is particularly useful for receiver automatic gain control and link layer assessments.

In contrast, the frame delimiter detector uses a frequency domain correlator which correlates the longer frame delimiter pattern using a differentiated phase-domain (FM) correlator. The FM domain correlation presents good cross-correlation properties only when the correlation window is long and is suitable for the detection of the long frame delimiter. Accordingly, using the FM domain correlator on the frame delimiter pattern allows estimating CFO thus avoiding the need of using the short preamble for that purpose.

The disclosed embodiment provides a more power efficient approach since even if the PM preamble detector is more power consuming, the overall method is power efficient because the PM/FM domains operations are matched for their efficiencies, and when the preamble detector si searching for the preamble, then the frame delimiter detector is disabled. Further, the power detector is utilized to prevent unnecessary operation of the preamble detector and the frame delimiter detector.

Figure 6:
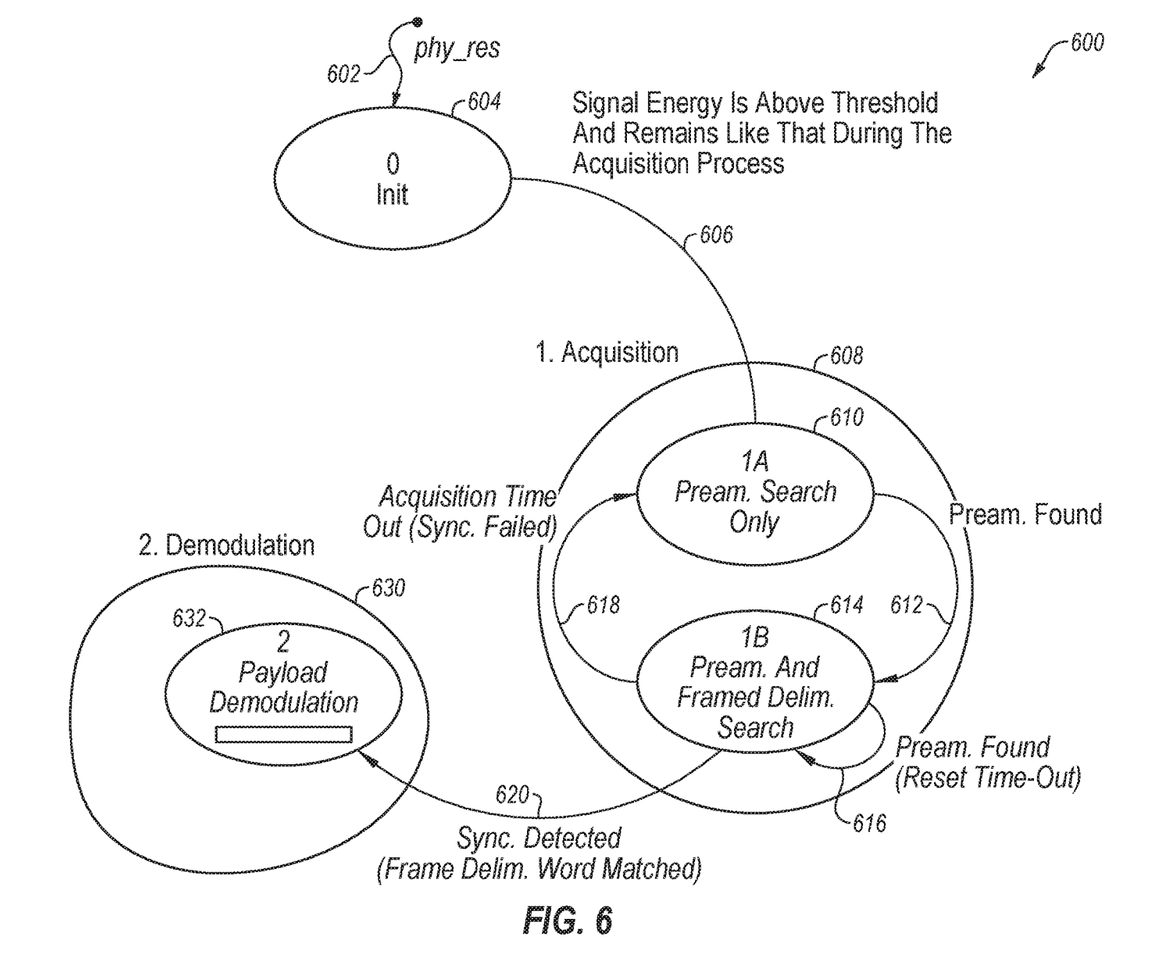
FIG. 6 illustrates a flow diagram of the acquisition detector, in accordance with embodiments described herein.

FIG. 6 illustrates a flow diagram 600 of the acquisition detector 106, in accordance with embodiments. The flow diagram 600 illustrates the operation of both the preamble detector 320 and the frame delimiter detector 370, both of FIG. 3. The flow starts from a physical reset 602 causing transition to an initialization state 604. The operation exits the initialization state 604 in a flow 606 when the signal energy as determined by power detector 380 is above a threshold designating a detected signal above a noise floor.

The analysis of the received signal includes an acquisition process 608 and a demodulation process 630. The acquisition process 608 includes a preamble search state 610 where the acquisition detector 306 operates the preamble detector 320 to search for a pattern match corresponding to the preamble pattern. The preamble detector 320 continues to search for preamble patterns and when a match is identified, then a preamble found flow 612 is traversed to a preamble search and frame delimiter search state 614 is reached. In the preamble search and frame delimiter search state 614, the frame delimiter detector 370 is activated and the preamble detector 320 remains activated.

During the preamble search and frame delimiter search state 614, the preamble detector 320 continues to search for subsequent preambles while the frame delimiter detector 370 begins the search for a match between the frame delimiter signals and a stored frame delimiter pattern. When the preamble detector detects a subsequent preamble, then a flow 616 resets the frame delimiter search timer 392, and the preamble detector 320 and the frame delimiter detector 370 continue to search for pattern matches.

When the frame delimiter search timer 392 times out, then processing reverts over flow 618 to the preamble search state 610. When the frame delimiter search timer 392 has not timed out and the frame delimiter detector 370 identifies a frame delimiter pattern match with the input signal and a frame delimiter pattern 319, then a flow 620 transitions the operation to the demodulation process 630. In the demodulation process 630, the payload in the frame is demodulated by process 632.

Figure 7:
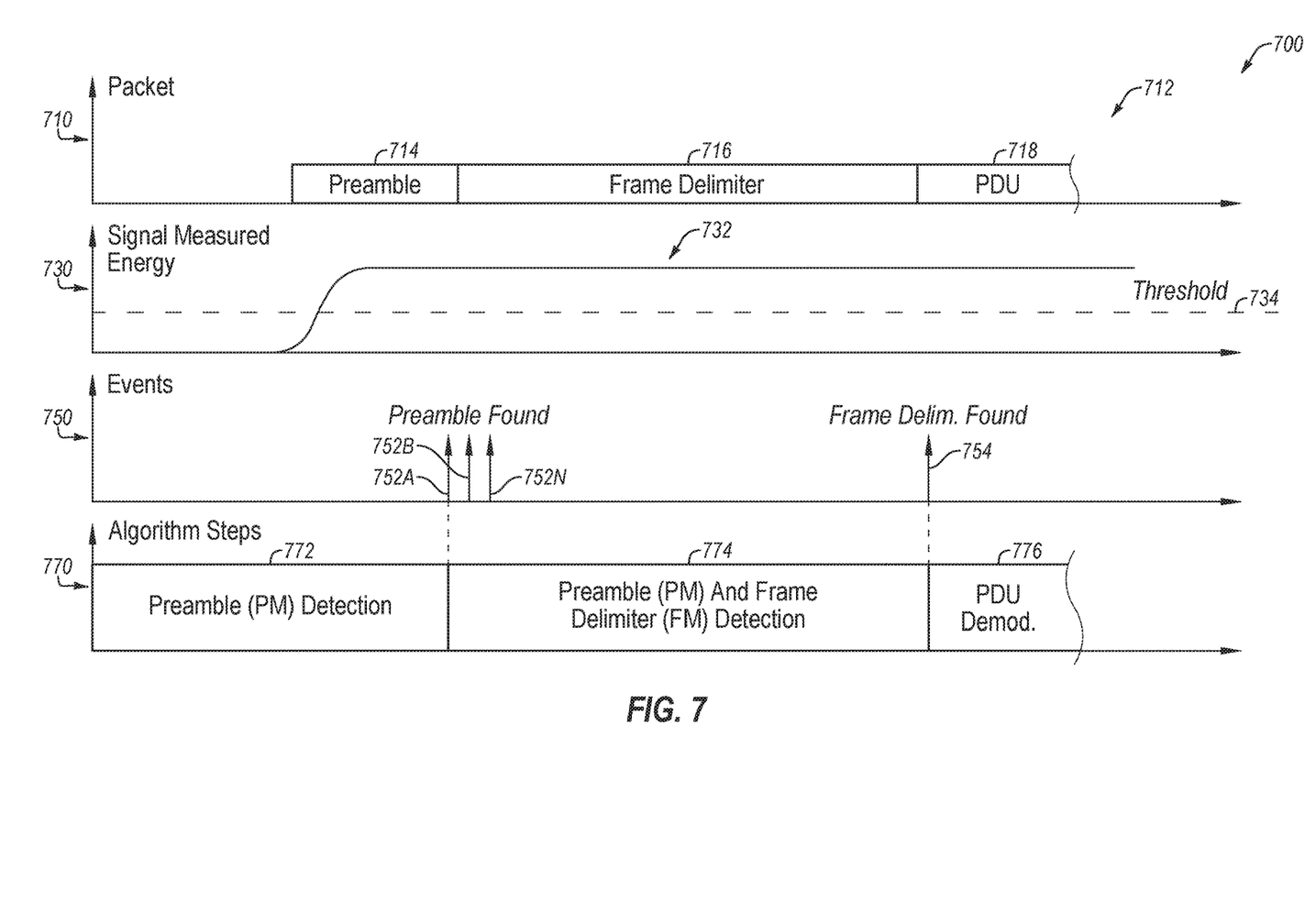
FIG. 7 illustrates a timing diagram of the acquisition detector and demodulator, in accordance with embodiments described herein.

FIG. 7 illustrates a timing diagram 700, in accordance with embodiments. The timing diagram 700 corresponds to the various states and flows of the flow diagram of FIG. 6. The timing diagram 700 includes a plot 710 of a data frame 712, corresponding to the data frame 200 of FIG. 2. The data frame 712 includes a preamble 714, a frame delimiter 716, and a payload data unit (PDU) 718, which respectively correspond to the preamble 202, a frame delimiter 204, and a payload data unit (PDU) 206, of FIG. 2.

The timing diagram 700 further includes a plot 730 of the measured energy 732 received at the IQ input signal 384 of the power detector 380, of FIG. 3. As noted in FIG. 7, prior to receipt of the preamble 714, the measured energy 732 level is below a threshold 734. When the preamble 714 arrives at the input of the power detector 380, then the measured energy 732 of the input signal exceeds the threshold 734 and stays exceeding that level for at least the duration of the data frame 712.

The timing diagram 700 further includes a plot 750 identifying preamble and frame delimiter matches. The timing diagram 700 further includes a plot 770 identifying the various states of operation, as described with respect to FIG. 6. During a state 772, the preamble detector 320 is activated and continuously looks for a preamble pattern match. When a match is found, then the preamble detector 320 issues a preamble detected signal 752A. When a preamble is detected, then the operations transition to the preamble and frame delimiter search state 774.

During the frame delimiter search state 774, the preamble detector 320 continues to search the input signal for a preamble pattern match, and when discovered, causes a subsequent new issue of a preamble detected signals 752B and 752N. Further, when the operations in frame delimiter search state 774 identify a frame delimiter, then a frame delimiter detected signal 754 is issued, and the operations transitions to the state 776.

A system and method have been described herein that provide benefits and advantages. For protocols that utilized short preambles combined with a variable length frame delimiter, advantages include maintaining the preamble detector and the frame delimiter detector powered off until a viable incoming input signal is detected results in the conservation of power in the communication device. Further, the disclosed system and method provide the advantage of early packet detection by performing preamble detection on a phase domain input signal. Such early detection of a preamble provides the advantage of providing feedback to the AGC of the receiver that can hold or maintain the gains in the receiver.

Further, in multiple access embodiments such as CSMA-CA as utilized in IEEE 802.15 applications, timely detection of a preamble reduces collisions resulting from detection of a CCA prior to the detection of an incoming packet. Yet further, the system and method described herein provide an advantage of a robust and higher resolution of time and frequency via FM domain frame delimiter detection because both the time and frequency estimates extracted from the frequency domain (FD) frame delimiter have improved quality with respect to legacy preamble-based estimation methods.

The descriptions and drawings illustrate the principles of various example embodiments. It will thus be appreciated that those skilled in the art will be able to devise various arrangements that, although not explicitly described or shown herein, embody the principles of the invention and are included within its scope.

Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative").

Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable. Values such as maximum or minimum may be predetermined and set to different values based on the application.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

The invention claimed is:

1. A method of frame synchronization in a communication system, comprising:
    receiving an input signal including a plurality of symbols of a communication frame;
    searching in the plurality of symbols for a preamble match with a known preamble pattern when a power level of the input signal exceeds a determined noise threshold;
    searching in the plurality of symbols for a frame delimiter match with a known frame delimiter pattern when the preamble match is identified and the power level of the input signal exceeds a determined noise threshold;
    demodulating a remaining portion of the plurality of symbols when the frame delimiter match is identified and the power level of the input signal exceeds a determined noise threshold; and
    continuously searching in the plurality of symbols for the preamble match while the searching in the plurality of symbols for the frame delimiter match occurs, wherein when another preamble match is identified during the searching for the frame delimiter match, resetting a frame delimiter search timer and continue the searching in the plurality of symbols for the frame delimiter match with the known frame delimiter pattern.

2. The method of claim 1, further comprising:
    continuously detecting the power level of the input signal during acquisition of the communication frame; and
    generating a signal present signal when the power level exceeds the predetermined power level.

3. The method of claim 1, wherein when another preamble match is not identified before the frame delimiter search timer expires, ceasing searching in the plurality of symbols for a frame delimiter match.

4. The method of claim 1, wherein the searching in the plurality of symbols for the preamble match is performed using a phase signal of the plurality of symbols with the input signal normalized in polar coordinates.

5. A method of frame synchronization in a communication system, comprising:
    receiving an input signal including a plurality of symbols of a communication frame;
    searching in the plurality of symbols for a preamble match with a known preamble pattern when a power level of the input signal exceeds a determined noise threshold;
    searching in the plurality of symbols for a frame delimiter match with a known frame delimiter pattern when the preamble match is identified and the power level of the input signal exceeds a determined noise threshold; and
    demodulating a remaining portion of the plurality of symbols when the frame delimiter match is identified and the power level of the input signal exceeds a determined noise threshold,
    wherein the searching in the plurality of symbols for the frame delimiter match is performed using a dot product of an IQ signal formed from a phase signal of the plurality of symbols and the known frame delimiter pattern.

6. The method of claim 5, further comprising:
continuously detecting the power level of the input signal during acquisition of the communication frame; and
generating a signal present signal when the power level exceeds the predetermined power level.

7. The method of claim 5, wherein the searching in the plurality of symbols for the preamble match is performed using a phase signal of the plurality of symbols with the input signal normalized in polar coordinates.

8. The method of claim 5, further comprising:
generating a timing correction signal from a magnitude portion of the dot product, the timing correction signal configured to adjust timing of the communication frame; and
generating a carrier frequency correction signal from a phase portion of the dot product, the carrier frequency correction signal configured to adjust a frequency for downconverting the input signal.

9. A system, comprising:
an acquisition detector configured to receive an input signal including a plurality of symbols of a communication frame, the acquisition detector including:
a preamble detector configured to search in the plurality of symbols for a preamble match with a known preamble pattern when a power level of the input signal exceeds a determined noise threshold; and
a frame delimiter detector configured to search in the plurality of symbols for a frame delimiter match with a known frame delimiter pattern when the preamble match is identified and the power level of the input signal exceeds a determined noise threshold;
a demodulator configured to demodulate a remaining portion of the plurality of symbols when the frame delimiter match is identified and the power level of the input signal exceeds a determined noise threshold; and
a power detector configured to:
continuously detect the power level of the input signal during acquisition of the communication frame, and
generate a signal present signal when the power level of the input signal exceeds the predetermined power level,
wherein the preamble detector and the frame delimiter detector are deactivated when the power level of the input signal does not exceed the predetermined power level.

10. The system of claim 9, wherein the preamble detector is configured to search for the preamble match using a phase signal of the plurality of symbols with the input signal normalized in polar coordinates.

11. A system, comprising:
an acquisition detector configured to receive an input signal including a plurality of symbols of a communication frame, the acquisition detector including:
a preamble detector configured to search in the plurality of symbols for a preamble match with a known preamble pattern when a power level of the input signal exceeds a determined noise threshold; and
a frame delimiter detector configured to search in the plurality of symbols for a frame delimiter match with a known frame delimiter pattern when the preamble match is identified and the power level of the input signal exceeds a determined noise threshold; and
a demodulator configured to demodulate a remaining portion of the plurality of symbols when the frame delimiter match is identified and the power level of the input signal exceeds a determined noise threshold,
wherein the preamble detector is further configured to continuously search in the plurality of symbols for the preamble match while the frame delimiter detector continues to search in the plurality of symbols for the frame delimiter match.

12. The system of claim 11, wherein the frame delimiter search timer is further configured to cease searching in the plurality of symbols for a frame delimiter match when another preamble match is not identified before the frame delimiter search timer expires.

13. The system of claim 11, wherein the preamble detector is configured to search for the preamble match using a phase signal of the plurality of symbols with the input signal normalized in polar coordinates.

14. A system, comprising:
an acquisition detector configured to receive an input signal including a plurality of symbols of a communication frame, the acquisition detector including:
a preamble detector configured to search in the plurality of symbols for a preamble match with a known preamble pattern when a power level of the input signal exceeds a determined noise threshold; and
a frame delimiter detector configured to search in the plurality of symbols for a frame delimiter match with a known frame delimiter pattern when the preamble match is identified and the power level of the input signal exceeds a determined noise threshold; and
a demodulator configured to demodulate a remaining portion of the plurality of symbols when the frame delimiter match is identified and the power level of the input signal exceeds a determined noise threshold,
wherein the frame delimiter detector is configured to search for the frame delimiter match using a dot product of an IQ signal formed from a phase signal of the plurality of symbols and the known frame delimiter pattern.

15. The system of claim 14, wherein the frame delimiter detector is further configured to generate a timing correction signal from a magnitude portion of the dot product, the timing correction signal configured to adjust timing of the communication frame.

16. The system of claim 14, wherein the frame delimiter detector is further configured to generate a carrier frequency correction signal from a phase portion of the dot product, the carrier frequency correction signal configured to adjust a frequency for downconverting the input signal.

17. The system of claim 14, wherein the preamble detector is configured to search for the preamble match using a phase signal of the plurality of symbols with the input signal normalized in polar coordinates.

18. An acquisition detector comprising:
a preamble detector configured to search in a plurality of symbols for a preamble match with a known preamble pattern when a power level of the input signal exceeds a determined noise threshold; and
a frame delimiter detector configured to search in the plurality of symbols for a frame delimiter match with a known frame delimiter pattern when the preamble match is identified and the power level of the input signal exceeds a determined noise threshold,
wherein the preamble detector is configured to determine the preamble match based on a comparison in a phase domain, and the frame delimiter detector is configured to determine the frame delimiter match in a frequency domain.

* * * * *